(12) United States Patent
Yang

(10) Patent No.: US 11,178,729 B2
(45) Date of Patent: Nov. 16, 2021

(54) METHOD FOR SWITCHING COMMUNICATION MODE, AND TERMINAL DEVICE AND NETWORK DEVICE

(71) Applicant: Guangdong OPPO Mobile Telecommunications Corp., Ltd., Guangdong (CN)

(72) Inventor: Ning Yang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/345,464

(22) PCT Filed: Nov. 3, 2016

(86) PCT No.: PCT/CN2016/104478
§ 371 (c)(1),
(2) Date: Apr. 26, 2019

(87) PCT Pub. No.: WO2018/081993
PCT Pub. Date: May 11, 2018

(65) Prior Publication Data
US 2019/0254121 A1  Aug. 15, 2019

(51) Int. Cl.
*H04W 92/18* (2009.01)
*H04W 76/14* (2018.01)
(Continued)

(52) U.S. Cl.
CPC ........... *H04W 92/18* (2013.01); *H04W 36/14* (2013.01); *H04W 76/14* (2018.02); *H04W 76/27* (2018.02); *H04W 76/30* (2018.02); *H04W 80/02* (2013.01)

(58) Field of Classification Search
CPC .................................................. H04W 92/18
See application file for complete search history.

(56) References Cited

U.S. PATENT DOCUMENTS

2010/0279672 A1* 11/2010 Koskela ............... H04W 36/30
                                                                 455/418
2012/0127523 A1   5/2012 Terashita
(Continued)

FOREIGN PATENT DOCUMENTS

CN     101848518 A     9/2010
CN     103906251 A     7/2014
(Continued)

OTHER PUBLICATIONS

Extended European search report issued in corresponding European application No. 16920790.9 dated Jun. 24, 2019.
(Continued)

*Primary Examiner* — John D Blanton
(74) *Attorney, Agent, or Firm* — Young Basile Hanlon & MacFarlane, P.C.

(57) ABSTRACT

A method for switching a communication mode includes: a terminal device receives first indication information sent by a network device, used for instructing the terminal device to switch from a current communication mode to a target communication mode, the current communication mode and the target communication mode are any two of a first communication mode, a second communication mode, and a third communication mode, the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device; and the terminal device switches a communication mode according to the first indication information.

19 Claims, 3 Drawing Sheets

A terminal device receives first indication information sent by a network device. ⟶ 110

The terminal device switches a communication mode according to the first indication information. ⟶ 120

(51) Int. Cl.
*H04W 80/02* (2009.01)
*H04W 76/27* (2018.01)
*H04W 76/30* (2018.01)
*H04W 36/14* (2009.01)

(56) References Cited

U.S. PATENT DOCUMENTS

| | | | | |
|---|---|---|---|---|
| 2015/0201392 A1* | 7/2015 | Sartori | ............... | H04W 8/005 |
| | | | | 370/329 |
| 2016/0029429 A1* | 1/2016 | Peng | ............... | H04W 24/10 |
| | | | | 370/329 |
| 2016/0044707 A1 | 2/2016 | Folke et al. | | |
| 2016/0100412 A1* | 4/2016 | Shin | ............... | H04W 76/23 |
| | | | | 370/336 |
| 2017/0325229 A1* | 11/2017 | Gao | ............... | H04W 72/10 |
| 2018/0192456 A1* | 7/2018 | Li | ............... | H04W 76/14 |
| 2019/0045575 A1* | 2/2019 | Huang | ............... | H04W 76/10 |
| 2019/0159053 A1* | 5/2019 | Tsuda | ............... | H04W 48/16 |

FOREIGN PATENT DOCUMENTS

| | | |
|---|---|---|
| CN | 103916916 A | 7/2014 |
| CN | 104349462 A | 2/2015 |
| CN | 104617979 A | 5/2015 |
| CN | 104936292 A | 9/2015 |
| CN | 106034340 A | 10/2016 |
| JP | 2016516380 A | 6/2016 |
| JP | 2016526835 A | 9/2016 |
| WO | 2015144048 A1 | 10/2015 |
| WO | 2015168949 A1 | 11/2015 |

OTHER PUBLICATIONS

European examination issued in corresponding European application No. 16920790.9 dated Apr. 20, 2020.
3GPP TSG-RAN WG2 #95bis; Tdoc R2-166729; Kaohsiung, Taiwan, Oct. 10-14, 2016.
3GPP TSG RAN WG2 Meeting #95bis R2-166263; Kaohsiung, Oct. 10-14, 2016.
China Office Action and English Translation for CN Application 201680089532.4 dated Oct. 19, 2020.
India First Examination Report for IN Application 201917020273 dated Dec. 7, 2020.
Japan Office Action with English Translation of JP Application 2019523025 dated Oct. 27, 2020.
Communication pursuant to Article 94(3) EPC Examination for EP 16920790.9 dated Nov. 5, 2020.
Japan Office Action with English Translation of JP Application 2019-523025 dated Mar. 12, 2021. (8 pages).
Japanese Decision of Refusal with English Translation for JP Application 2019523025 dated Aug. 6, 2021. (7 pages).
Taiwan Office Action with English Translation for TW Application 106137800 dated Jul. 12, 2021. (13 pages).

\* cited by examiner

METHOD FOR SWITCHING COMMUNICATION MODE, AND TERMINAL DEVICE AND NETWORK DEVICE

CROSS-REFERENCE TO RELATED APPLICATION(S)

This application is a 371 application of International Application No. PCT/CN2016/104478, filed on Nov. 3, 2016, the entire disclosure of which is hereby incorporated by reference.

TECHNICAL FIELD

Embodiments of the present disclosure relate to the field of communication, and more particularly, to a method for switching a communication mode, a terminal device and a network device.

BACKGROUND

In the future, application fields of a communication system (such as a cellular network system) will be expanded from traditional human-to-human communication to vehicle-to-human and vehicle-to-vehicle communication, which can effectively improve traffic efficiency, avoid traffic accidents and reduce traffic risks.

Taking V2X as an example, in a process of V2X communication, a terminal device (which may be a vehicle, for example) needs to use a communication mode in which the communication is performed via a direct-connection interface (or referred to as a sidelink interface) or a communication mode in which the communication is performed via an air interface (i.e., a Uu interface) for user data communication, to ensure normal data information interchange between terminal devices and between the terminal and the outside world.

However, in the prior art, when a terminal device communicates in one communication mode, the terminal device cannot communicate in other communication modes, flexibility of a communication system is reduced.

SUMMARY

Embodiments of the present disclosure provide a method for switching a communication mode, a terminal device and a network device.

In a first aspect, a method for switching a communication mode is provided, which includes: receiving, by a terminal device, first indication information sent by a network device, wherein the first indication information is used for instructing the terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device; and switching, by the terminal device, a communication mode according to the first indication information.

In connection with the first aspect, in some implementations of the first aspect, the current communication mode is one of the first communication mode and the second communication mode, and the target communication mode is another one, other than the current communication mode, of the first communication mode and the second communication mode, and receiving, by the terminal device, the first indication information sent by the network device, includes: receiving, by the terminal device, reconfiguration signaling sent by the network device, the reconfiguration signaling includes the first indication information, and the reconfiguration signaling is used for instructing the terminal device to switch the communication mode to the target communication mode according to the first indication information while maintaining a control connection between the terminal device and the network device.

In connection with the first aspect, in some implementations of the first aspect, the reconfiguration signaling is one of the following signaling: Radio Resource Control (RRC) reconfiguration signaling, Media Access Control Control Element (MAC CE), and physical layer signaling.

In connection with the first aspect, in some implementations of the first aspect, the current communication mode is one of the first communication mode and the second communication mode, and the target communication mode is another one, other than the current communication mode, of the first communication mode and the second communication mode, and receiving, by the terminal device, the first indication information sent by the network device, includes: receiving, by the terminal device, release signaling sent by the network device, the release signaling includes the first indication information, and the release signaling is used for instructing the terminal device to switch the communication mode to the target communication mode according to the first indication information after releasing a control connection between the terminal device and the network device.

In connection with the first aspect, in some implementations of the first aspect, the release signaling is one of the following signaling: RRC connection release signaling, MAC CE, and physical layer signaling.

In connection with the first aspect, in some implementations of the first aspect, receiving, by the terminal device, the first indication information sent by the network device, includes: receiving, by the terminal device, system information sent by the network device, wherein the system information includes the first indication information.

In connection with the first aspect, in some implementations of the first aspect, before receiving, by the terminal device, the first indication information sent by the network device, the method further includes: sending, by the terminal device, resource occupancy information to the network device, wherein the resource occupancy information is used for indicating an occupancy status of a communication resource in the current communication mode.

In connection with the first aspect, in some implementations of the first aspect, the resource occupancy information includes at least one of interference related information of the communication resource, and collision related information of the communication resource.

In connection with the first aspect, in some implementations of the first aspect, the method further includes: sending, by the terminal device, service information of a service to be processed of the terminal device to the network device.

In combination with the first aspect, in some implementations of the first aspect, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

In connection with the first aspect, in some implementations of the first aspect, the method further includes: receiving, by the terminal device, second indication information sent by the network device, wherein the second indication information is used for indicating a trigger event of switching, by the terminal device, from the current communication mode to the target communication mode.

In connection with the first aspect, in some implementations of the first aspect, the second indication information is used for instructing the terminal device to switch from the current communication mode to the target communication mode when the occupancy status of the communication resource in the current communication mode satisfies a condition indicated by the second indication information.

In connection with the first aspect, in some implementations of the first aspect, the condition indicated by the second indication information includes at least one of the following conditions: a threshold value of an interference level of the communication resource, and a threshold value of a collision level of the communication resource.

In connection with the first aspect, in some implementations of the first aspect, the terminal device is a terminal device in an idle state.

In a second aspect, a method for switching a communication mode is provided and includes: generating, by a network device, first indication information, wherein the first indication information is used for instructing a terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device; and sending, by the network device, the first indication information to the terminal device.

In connection with the second aspect, in some implementations of the second aspect, the current communication mode is one of the first communication mode and the second communication mode, and the target communication mode is another one, other than the current communication mode, of the first communication mode and the second communication mode, and sending, by the network device, the first indication information to the terminal device, includes: sending, by the network device, reconfiguration signaling to the terminal device, wherein the reconfiguration signaling includes the first indication information, and the reconfiguration signaling is used for instructing the terminal device to switch a communication mode to the target communication mode according to the first indication information while maintaining a control connection between the terminal device and the network device.

In connection with the second aspect, in some implementations of the second aspect, the reconfiguration signaling is one of the following signaling: Radio Resource Control (RRC) reconfiguration signaling, Media Access Control Control Element (MAC CE), and physical layer signaling.

In connection with the second aspect, in some implementations of the second aspect, the current communication mode is one of the first communication mode and the second communication mode, and the target communication mode is another one, other than the current communication mode, of the first communication mode and the second communication mode, and sending, by the network device, the first indication information to the terminal device, includes: sending, by the network device, release signaling to the terminal device, wherein the release signaling includes the first indication information, and the release signaling is used for instructing the terminal device to switch a communication mode to the target communication mode according to the first indication information after releasing a control connection between the terminal device and the network device.

In connection with the second aspect, in some implementations of the second aspect, the release signaling is one of the following signaling: RRC connection release signaling, MAC CE, and physical layer signaling.

In connection with the second aspect, in some implementations of the second aspect, sending, by the network device, the first indication information to the terminal device includes: sending, by the network device, system information to the terminal device, wherein the system information includes the first indication information.

In connection with the second aspect, in some implementations of the second aspect, before generating, by the network device, the first indication information, the method further includes: receiving, by the network device, resource occupancy information sent by the terminal device, wherein the resource occupancy information is used for indicating an occupancy status of a communication resource in the current communication mode.

In connection with the second aspect, in some implementations of the second aspect, the resource occupancy information includes at least one of interference related information of the communication resource, and collision related information of the communication resource.

In connection with the second aspect, in some implementations of the second aspect, the method further includes: receiving, by the network device, service information of a service to be processed of the terminal device sent by the terminal device.

In combination with the second aspect, in some implementations of the second aspect, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

In connection with the second aspect, in some implementations of the second aspect, the method further includes: sending, by the network device, second indication information to the terminal device, wherein the second indication information is used for indicating a trigger event of switching, by the terminal device, from the current communication mode to the target communication mode.

In connection with the second aspect, in some implementations of the second aspect, the second indication information is used for instructing the terminal device to switch from the current communication mode to the target communication mode when the occupancy status of a communication resource in the current communication mode satisfies a condition indicated by the second indication information.

In connection with the second aspect, in some implementations of the second aspect, the condition indicated by the second indication information includes at least one of the following conditions: a threshold value of an interference level of the communication resource, and a threshold value of a collision level of the communication resource.

In connection with the second aspect, in some implementations of the second aspect, the terminal device is a terminal device in an idle state.

In a third aspect, a terminal device is provided, which includes modules for performing the method of the first aspect.

In a fourth aspect, a network device is provided, which includes modules for performing the method of the second aspect.

In a fifth aspect, a terminal device is provided and includes a processor and a transceiver, and the processor implements the method of the first aspect based on the transceiver.

In a sixth aspect, a network device is provided and includes a processor and a transceiver, and the processor implements the method of the second aspect based on the transceiver.

In a seventh aspect, a non-transitory computer readable medium is provided, which stores program codes for execution by a terminal device, wherein, the program codes includes instructions for executing the method of the first aspect.

In an eighth aspect, a non-transitory computer readable medium is provided, which stores program codes for execution by a network device, wherein the program codes includes instructions for performing the method of the second aspect.

BRIEF DESCRIPTION OF DRAWINGS

In order to explain technical solutions of the embodiments of the present disclosure more clearly, drawings to be used in the embodiments of the present disclosure will be briefly described below. Apparently, the drawings in the following description are only some embodiments of the present disclosure. For those of ordinary skill in the art, other drawings can be obtained without paying an inventive effort.

DETAILED DESCRIPTION

Figure 1:
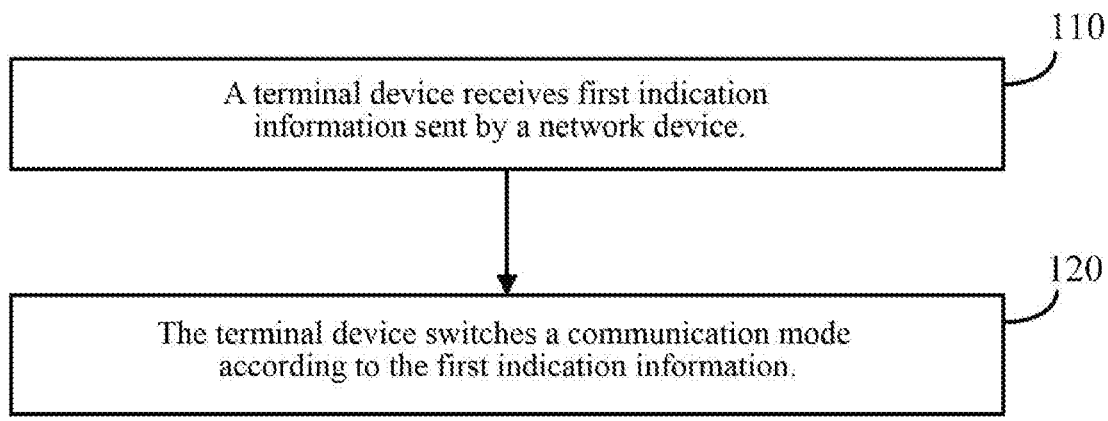
FIG. 1 is a schematic flowchart of a method for switching a communication mode according to an embodiment of the present disclosure.

The technical solutions in embodiments of the present disclosure will be described clearly and completely in the following with reference to the drawings in the embodiments of the present disclosure.

It should be understood that in embodiments of the present disclosure, a terminal device may include, but not limited to, a Mobile Station (MS), a Mobile Terminal, a Mobile Telephone, a User Equipment (UE), a handset, a portable equipment, or a vehicle, etc. The terminal device may communicate with one or more core networks via a Radio Access Network (RAN). For example, the terminal device may be a mobile phone (or referred to as "cellular" phone) or a computer with wireless communication function, or the terminal device may be a portable mobile apparatus, a pocket-sized mobile apparatus, a hand-held mobile apparatus, a built-in mobile apparatus, or a vehicle-mounted mobile apparatus.

It should also be understood that in embodiments of the present disclosure, a network device may be an access network device, such as a base station, a Transmit and Receive Point (TRP), or an access point, and the base station may be a Base Transceiver Station (BTS) in GSM or CDMA, a base station (NodeB) in WCDMA, an evolved Node B(eNB or E-NodeB) in LTE, or a base station (gNB) of NR or 5G, which is not specifically restricted in the embodiments of the present disclosure.

Embodiments of the present disclosure may be applied to a variety of communication systems, such as V2V, V2X, or device to device (D2D) communication systems, which are not specifically restricted in the embodiments of the present disclosure. Taking a V2X communication system as an example, generally there are three communication modes in the V2X communication system, namely, a communication mode in which the communication is performed via a Uu interface, a communication mode in which the communication is performed via a direct-connection interface and controlled by a network device, and a communication mode in which the communication is performed via a direct-connection interface and controlled (or selected) by a terminal device.

Specifically, the communication mode in which the communication is performed via a Uu interface may also be referred to as a communication mode in which the communication is performed via an air interface, and in this communication mode, a terminal device may establish, reconfigure and release various radio bearer services with a network device (such as a base station). The communication mode in which the communication is performed via a direct-connection interface and controlled by a network device may refer to a direct-connection communication between a terminal device and a terminal device, and in this communication mode, the communication resource between the terminal device and the terminal device may be allocated by the network device. The communication mode in which the communication is performed via a direct-connection interface and controlled by a terminal device may refer to a direct-connection communication between a terminal device and a terminal device, and in this communication mode, the communication resource between the terminal device and the terminal device may be allocated autonomously by the terminal device.

It should be noted that a communication performed via a direct-connection interface in the present application may refer to a communication between a terminal device and a terminal device, for example, the communication may be data information interchange or communication between the terminal device and the terminal device. Optionally, in some embodiments, a communication performed via a direct-connection interface may be referred to as a communication performed via a sidelink, but embodiments of the present disclosure are not limited thereto.

In order to improve flexibility of a communication system, an embodiment of the present disclosure introduces a switching mechanism between communication modes, which will be described in detail below with reference to FIG. 1.

FIG. 1 is a schematic flowchart of a method for switching a communication mode according to an embodiment of the present disclosure. The method of FIG. 1 includes acts 110 and 120.

In 110, a terminal device receives first indication information sent by a network device, wherein the first indication information is used for instructing the terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by a network device, and the third communication mode is a communication mode in which the communication is performed via a direct-connection interface and controlled by the terminal device.

In 120, the terminal device switches a communication mode according to the first indication information.

In an embodiment of the present disclosure, the terminal device performs switching between different communication modes based on the first indication information sent by the network device, so that the terminal device may switch between various communication modes, and flexibility of the communication system is improved.

Optionally, in some embodiments, the current communication mode is one of the first communication mode and the second communication mode, and the target communication mode is another one, other than the current communication mode, of the first communication mode and the second communication mode. Act 110 may include: receiving, by the terminal device, reconfiguration signaling sent by the network device, the reconfiguration signaling includes the first indication information, and the reconfiguration signaling is used for instructing the terminal device to switch the communication mode to (or configure the communication mode as) the target communication mode according to the first indication information when the terminal device maintains a control connection between the terminal device and the network device.

Optionally, in some embodiments, the reconfiguration signaling is one of Radio Resource Control (RRC) reconfiguration signaling (or referred to as RRC reconfiguration message), Medium Access Control (MAC) Control Element (CE), and physical layer signaling. The physical layer signaling may be downlink control information (DCI), for example.

Optionally, in some embodiments, the current communication mode is one of the first communication mode and the second communication mode, and the target communication mode is another one, other than the current communication mode, of the first communication mode and the second communication mode. Act 110 may include: receiving, by the terminal device, release signaling sent by the network device, the release signaling includes the first indication information, and the release signaling is used for instructing the terminal device to switch the communication mode to (or configure the communication mode as) the target communication mode according to the first indication information after releasing a control connection between the terminal device and the network device.

Specifically, in some embodiments, if the terminal device re-establishes a new connection with the network device after releasing the control connection between the terminal device and the network device, the terminal device may switch the communication mode to (or configure the communication mode as) the target communication mode according to the first indication information when establishing the new connection. In other embodiments, if the terminal device enters a third communication mode after releasing the control connection between the terminal device and the network device, the terminal device may switch the communication mode to (or configure the communication mode as) the target communication mode according to the first indication information in a process of establishing a link between the terminal device and a terminal device.

Optionally, in some embodiments, the release signaling is one of RRC connection release signaling (or RRC connection release message), MAC CE, and physical layer signaling. The physical layer signaling may be DCI, for example.

Optionally, in some embodiments, act 110 may include: receiving, by the terminal device, system information sent by the network device, wherein the system information includes the first indication information. The system information may be, for example, a system information block (SIB).

Optionally, in some embodiments, before act 110, the method in FIG. 1 may further include: sending, by the terminal device, resource occupancy information to the network device, wherein the resource occupancy information is used for indicating an occupancy status of a communication resource in the current communication mode. Further, the resource occupancy information is used for indicating the occupancy status of a communication resource in the current communication mode so that the network device determines to switch the terminal device from the current communication mode to the target communication mode based on the resource occupancy information. Or, in other words, the resource occupancy information is used by the network device to determine whether to switch the communication mode of the terminal device.

Optionally, in some embodiments, the resource occupancy information includes at least one of interference related information of the communication resource, and collision related information of the communication resource.

Optionally, in some embodiments, the method in FIG. 1 may further include: sending, by the terminal device, service information of a service to be processed of the terminal device to the network device. It should be noted that in embodiments of the present disclosure, a time sequence of sending, by the terminal device, the service information of the service to be processed of the terminal device to the network device is not restricted. For example, the terminal device may send the service information of the service to be processed of the terminal device to the network device before executing act 110, so that the network device can determine whether to switch the communication mode of the terminal device based on the service information. For another example, if the indication information is release signaling, the terminal device may send the service information of the service to be processed of the terminal device to the network device in a process of establishing a new connection with the network device.

It should be understood that in an embodiment of the present disclosure, a type of service information is not specifically restricted. For example, the service information of the service to be processed includes at least one of the following: a transmission period of a data packet in the service to be processed, a transmission mode of a data packet in the service to be processed, a type of a bearer used by the service to be processed, and a size of a data packet in the service to be processed. There are many ways to define the bearer used by the service to be processed. Optionally, in some embodiments, bearers with different qualities of service (QoS) may be defined as different types of bearers. Optionally, in other embodiments, bearers corresponding to different types of services may be defined as bearers of different types, such as bearers of voice services or bearers of data services. There are many ways to define a transmission mode of a data packet in the service to be processed, such as a transmission interval between data packets and/or a transmission rate of a data packet.

Optionally, in some embodiments, the method in FIG. 1 may further includes: receiving, by the terminal device, second indication information sent by the network device, wherein the second indication information is used for indicating a trigger event of switching, by the terminal device, from the current communication mode to the target communication mode.

It should be noted that in an embodiment of the present disclosure, a type of a trigger event is not specifically restricted. For example, a trigger event may be a service of a particular type. In this case, the second indication information may be used for instructing the terminal device to switch from the current communication mode to the target communication mode when the terminal device needs to send a service of a special type. As another example, a trigger event may be a condition. In this case, the second indication information may be used for instructing the terminal device to switch from the current communication mode to the target communication mode when the occupancy status of the communication resource in the current communication mode satisfies a condition indicated by the second indication information.

Optionally, in some embodiments, a condition indicated by second indication information may include at least one of the following conditions: a threshold value of an interference level of the communication resource, and a threshold value of a collision level of the communication resource, of the terminal device in the current communication mode.

It should be noted that a network device may send second indication information to a terminal device in a connected state, or may send second indication information to a terminal device in an idle state. Specifically, in some embodiments, when a terminal device is in a connected state, a network device directly instructs the terminal device to switch through first indication information; and when a terminal device is in an idle state, a network device sends indications of first indication information and second indication information to a terminal device, so that the terminal device determines, based on the second indication information, whether to switch according to the first indication information.

A method for switching a communication mode according to an embodiment of the present disclosure has been described in detail above from a perspective of a terminal device in conjunction with FIG. 1, and a method for switching a communication mode according to an embodiment of the present disclosure will be described in detail below from a perspective of a network device in conjunction with FIG. 2. It should be understood that description for a network device side and description for a terminal device side correspond to each other, and similar descriptions may be found above, and in order to avoid repetition, they will not be described here.

Figure 2:
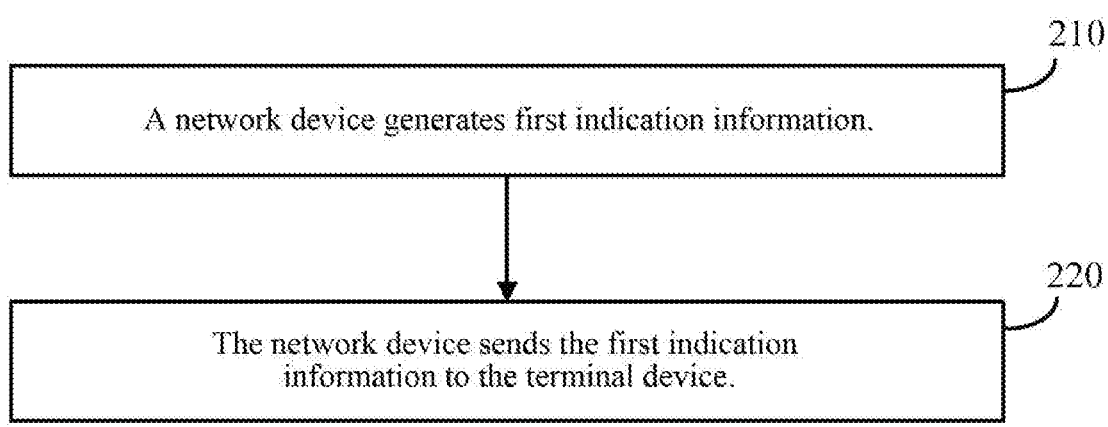
FIG. 2 is a schematic flowchart of a method for switching a communication mode according to an embodiment of the present disclosure.

FIG. 2 is a schematic flowchart of a method for switching a communication mode according to an embodiment of the present disclosure. The method of FIG. 2 includes acts 210 and 220.

In 210, a network device generates first indication information, the first indication information is used for instructing a terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device.

In 220, the network device sends the first indication information to the terminal device.

According to an embodiment of the present disclosure, a terminal device performs switching between different communication modes based on first indication information sent by a network device, so that the terminal device may switch between various communication modes, and flexibility of a communication system is improved.

Optionally, in some embodiments, the current communication mode is one of the first communication mode and the second communication mode, the target communication mode is another one, other than the current communication mode, of the first communication mode and the second communication mode, and sending, by the network device, the first indication information to the terminal device includes: sending, by the network device, reconfiguration signaling to the terminal device, wherein the reconfiguration signaling includes the first indication information, and the reconfiguration signaling is used for instructing the terminal device to switch a communication mode to the target communication mode according to the first indication information while maintaining a control connection between the terminal device and the network device.

Optionally, in some embodiments, the reconfiguration signaling is one of the following signaling: Radio Resource Control (RRC) reconfiguration signaling, Media Access Control Control Element (MAC CE), and physical layer signaling.

Optionally, in some embodiments, the current communication mode is one of the first communication mode and the second communication mode, the target communication mode is another communication one, other than the current communication mode, of the first communication mode and the second communication mode, and sending, by the network device, the first indication information to the terminal device includes: sending, by the network device, release signaling to the terminal device, wherein the release signaling includes the first indication information, and the release signaling is used for instructing the terminal device to switch a communication mode to the target communication mode according to the first indication information after releasing a control connection between the terminal device and the network device.

Optionally, in some embodiments, the release signaling is one of the following signaling: RRC connection release signaling, MAC CE, and physical layer signaling.

Optionally, in some embodiments, sending, by the network device, the first indication information to the terminal device includes: sending, by the network device, system information to the terminal device, wherein the system information includes the first indication information.

Optionally, in some embodiments, before the network device generates the first indication information, the method further includes: receiving, by the network device, resource occupancy information sent by the terminal device, wherein the resource occupancy information is used for indicating an occupancy status of a communication resource in the current communication mode.

Optionally, in some embodiments, the resource occupancy information includes at least one of interference related information of the communication resource, and collision related information of the communication resource.

Optionally, in some embodiments, the method of FIG. 2 may further include: receiving, by the network device, service information of a service to be processed of the terminal device sent by the terminal device.

Optionally, in some embodiments, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

Optionally, in some embodiments, the method of FIG. 2 may further include: sending, by the network device, second indication information to the terminal device, wherein the second indication information is used for indicating a trigger event of switching, by the terminal device, from the current communication mode to the target communication mode.

Optionally, in some embodiments, the second indication information is used for instructing the terminal device to switch from the current communication mode to the target communication mode when the occupancy status of the communication resource in the current communication mode satisfies a condition indicated by the second indication information.

Optionally, in some embodiments, the condition indicated by the second indication information includes at least one of the following conditions: a threshold value of an interference level of the communication resource, and a threshold value of a collision level of the communication resource.

Optionally, in some embodiments, the terminal device is a terminal device in an idle state.

Method embodiments of the present disclosure have been described in detail above with reference to FIGS. 1 and 2, and device embodiments of the present disclosure will be described in detail below with reference to FIGS. 3 to 6. It should be understood that device embodiments and method embodiments correspond to each other, and method embodiments may be referred to for similar descriptions.

Figure 3:
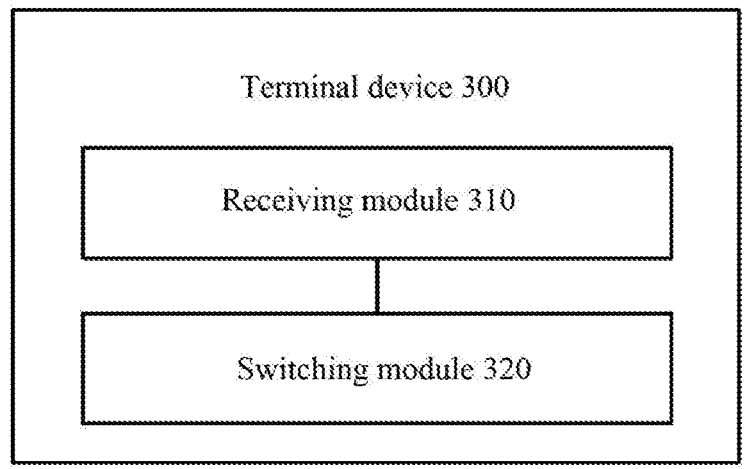
FIG. 3 is a schematic diagram of a terminal device according to an embodiment of the present disclosure.

FIG. 3 is a schematic diagram of a terminal device according to an embodiment of the present disclosure. As shown in FIG. 3, the terminal device 300 includes a determining module 310 and a switching module 320.

The receiving module 310 is used for receiving first indication information sent by a network device, wherein the first indication information is used for instructing the terminal device 300 to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device 300.

The switching module 320 is used for switching a communication mode according to the first indication information.

In an embodiment of the present disclosure, a terminal device performs switching between different communication modes based on first indication information sent by a network device, so that the terminal device may switch between various communication modes, and flexibility of a communication system is improved.

Optionally, in some embodiments, the current communication mode is one of the first communication mode and the second communication mode, the target communication mode is another one, other than the current communication mode, of the first communication mode and the second communication mode, the receiving module 310 is specifically used for receiving reconfiguration signaling sent by the network device, the reconfiguration signaling includes the first indication information, and the reconfiguration signaling is used for instructing the terminal device 300 to switch a communication mode to the target communication mode according to the first indication information while maintaining a control connection between the terminal device 300 and the network device.

Optionally, in some embodiments, the reconfiguration signaling is one of the following signaling: Radio Resource Control (RRC) reconfiguration signaling, Media Access Control Control Element (MAC CE), and physical layer signaling.

Optionally, in some embodiments, the current communication mode is one of the first communication mode and the second communication mode, the target communication mode is another one, other than the current communication mode, of the first communication mode and the second communication mode, the receiving module 310 is specifically used for receiving release signaling sent by the network device, the release signaling includes the first indication information, and the release signaling is used for instructing the terminal device 300 to switch a communication mode to the target communication mode according to the first indication information after releasing a control connection between the terminal device 300 and the network device.

Optionally, in some embodiments, the release signaling is one of the following signaling: RRC connection release signaling, MAC CE, and physical layer signaling.

Optionally, in some embodiments, the receiving module 310 is specifically used for receiving system information sent by the network device, and the system information includes the first indication information.

Optionally, in some embodiments, the terminal device 300 further includes: a first sending module used for sending resource occupancy information to the network device, wherein the resource occupancy information is used for indicating an occupancy status of a communication resource in the current communication mode.

Optionally, in some embodiments, the resource occupancy information includes at least one of interference related information of the communication resource, and collision related information of the communication resource.

Optionally, in some embodiments, the terminal device 300 further includes: a second sending module used for sending service information of a service to be processed of the terminal device 300 to the network device.

Optionally, in some embodiments, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

Optionally, in some embodiments, the receiving module 310 is further used for receiving second indication information from the network device, wherein the second indication information is used for indicating a trigger event of switching, by the terminal device 300, from the current communication mode to the target communication mode.

Optionally, in some embodiments, the second indication information is used for instructing the terminal device 300 to switch from the current communication mode to the target communication mode when the occupancy status of the communication resource in the current communication mode satisfies a condition indicated by the second indication information.

Optionally, in some embodiments, the condition indicated by the second indication information includes at least one of the following conditions: a threshold value of an interference level of the communication resource, and a threshold value of a collision level of the communication resource.

Optionally, in some embodiments, the terminal device 300 is a terminal device in an idle state.

Figure 4:
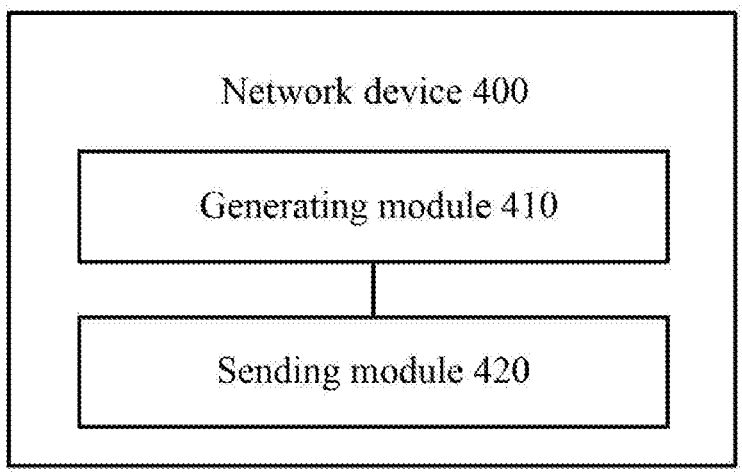
FIG. 4 is a schematic diagram of a network device according to an embodiment of the present disclosure.

FIG. 4 is a schematic diagram of a network device according to an embodiment of the present disclosure. The network device 400 of FIG. 4 includes: a generating module 410 and a sending module 420.

The generating module 410 is used for generating first indication information, wherein the first indication information is used for instructing a terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device 400, and the third communication mode is a communication mode in which the communication is performed via a direct-connection interface and controlled by the terminal device.

The sending module 420 is used for sending the first indication information to the terminal device.

In an embodiment of the present disclosure, a terminal device performs switching between different communication modes based on first indication information sent by a network device, so that the terminal device can switch between various communication modes, and flexibility of a communication system is improved.

Optionally, in some embodiments, the current communication mode is one of the first communication mode and the second communication mode, the target communication mode is another one, other than the current communication mode, of the first communication mode and the second communication mode, the sending module 420 is specifically used for sending reconfiguration signaling to the terminal device, the reconfiguration signaling includes the first indication information, and the reconfiguration signaling is used for instructing the terminal device to switch a communication mode to the target communication mode according to the first indication information while maintaining a control connection between the terminal device and the network device 400.

Optionally, in some embodiments, the reconfiguration signaling is one of the following signaling: Radio Resource Control (RRC) reconfiguration signaling, Media Access Control Control Element (MAC CE), and physical layer signaling.

Optionally, in some embodiments, the current communication mode is one of the first communication mode and the second communication mode, the target communication mode is another one, other than the current communication mode, of the first communication mode and the second communication mode, the sending module 420 is specifically used for sending release signaling to the terminal device, the release signaling includes the first indication information, and the release signaling is used for instructing the terminal device to switch a communication mode to the target communication mode according to the first indication information after releasing a control connection between the terminal device and the network device 400.

Optionally, in some embodiments, the release signaling is one of the following signaling: RRC connection release signaling, MAC CE, and physical layer signaling.

Optionally, in some embodiments, the sending module 420 is specifically used for sending system information to the terminal device, and the system information includes the first indication information.

Optionally, in some embodiments, the network device 400 further includes: a first receiving module used for receiving resource occupancy information sent by the terminal device, wherein the resource occupancy information is used for indicating an occupancy status of a communication resource in the current communication mode.

Optionally, in some embodiments, the resource occupancy information includes at least one of interference related information of the communication resource, and collision related information of the communication resource.

Optionally, in some embodiments, the network device 400 further includes: a second receiving module used for receiving service information of a service to be processed of the terminal device sent by the terminal device.

Optionally, in some embodiments, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

Optionally, in an embodiment, the sending module 420 is further used for sending second indication information to the terminal device, wherein the second indication information is used for indicating a trigger event of switching, by the terminal device, from the current communication mode to the target communication mode.

Optionally, in some embodiments, the second indication information is used for instructing the terminal device to switch from the current communication mode to the target communication mode when the occupancy status of the communication resource in the current communication mode satisfies a condition indicated by the second indication information.

Optionally, in some embodiments, the condition indicated by the second indication information includes at least one of the following conditions: a threshold value of an interference level of the communication resource, and a threshold value of a collision level of the communication resource.

Optionally, in some embodiments, the terminal device is a terminal device in an idle state.

Figure 5:
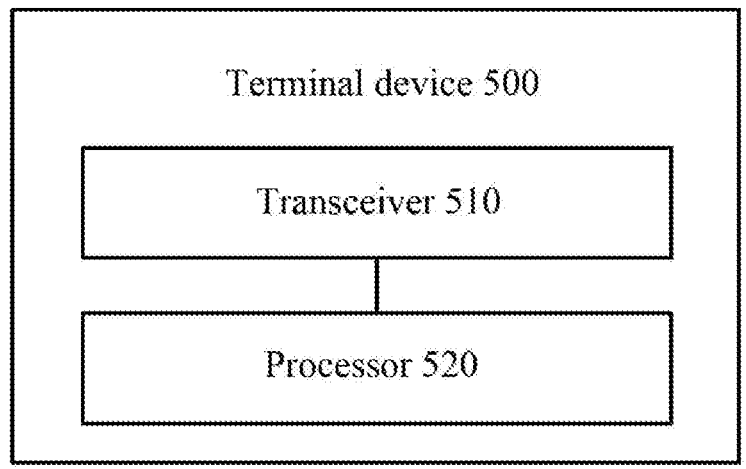
FIG. 5 is a schematic diagram of a terminal device according to an embodiment of the present disclosure.

FIG. 5 is a schematic diagram of a terminal device according to an embodiment of the present disclosure. As shown in FIG. 5, the terminal device 500 includes a transceiver 510 and a processor 520.

The transceiver 510 is used for receiving first indication information sent by a network device, wherein the first indication information is used for instructing the terminal device 500 to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is communication mode in which the communication is performed via a direct-connection interface and controlled by the terminal device 500.

The processor 520 is used for switching a communication mode according to the first indication information.

In an embodiment of the present disclosure, a terminal device performs switching between different communication modes based on first indication information sent by a network device, so that the terminal device may switch between various communication modes, and flexibility of a communication system is improved.

Optionally, in some embodiments, the current communication mode is one of the first communication mode and the second communication mode, the target communication mode is another one, other than the current communication mode, of the first communication mode and the second communication mode, the transceiver 510 is specifically used for receiving reconfiguration signaling sent by the network device, the reconfiguration signaling includes the first indication information, and the reconfiguration signaling is used for instructing the terminal device 500 to switch a communication mode to the target communication mode according to the first indication information while maintaining a control connection between the terminal device 500 and the network device.

Optionally, in some embodiments, the reconfiguration signaling is one of the following signaling: Radio Resource Control (RRC) reconfiguration signaling, Media Access Control Control Element (MAC CE), and physical layer signaling.

Optionally, in some embodiments, the current communication mode is one of the first communication mode and the second communication mode, the target communication mode is another one, other than the current communication mode, of the first communication mode and the second communication mode, the transceiver 510 is specifically used for receiving release signaling sent by the network device, the release signaling includes the first indication information, and the release signaling is used for instructing the terminal device 500 to switch a communication mode to the target communication mode according to the first indication information after releasing a control connection between the terminal device 500 and the network device.

Optionally, in some embodiments, the release signaling is one of the following signaling: RRC connection release signaling, MAC CE, and physical layer signaling.

Optionally, in some embodiments, the transceiver 510 is specifically used for receiving system information transmitted by the network device, and the system information includes the first indication information.

Optionally, in some embodiments, the transceiver 510 is also used for sending resource occupancy information to the network device, and the resource occupancy information is used for indicating an occupancy status of a communication resource in the current communication mode.

Optionally, in some embodiments, the resource occupancy information includes at least one of interference related information of the communication resource, and collision related information of the communication resource.

Optionally, in some embodiments, the transceiver 510 is also used for sending service information of a service to be processed of the terminal device 500 to the network device.

Optionally, in some embodiments, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

Optionally, in some embodiments, the transceiver 510 is also used for receiving second indication information from the network device, wherein the second indication information is used for indicating a trigger event of switching, by the terminal device 500, from the current communication mode to the target communication mode.

Optionally, in some embodiments, the second indication information is used for instructing the terminal device 500 to switch from the current communication mode to the target communication mode when the occupancy status of the communication resource in the current communication mode satisfies a condition indicated by the second indication information.

Optionally, in some embodiments, the condition indicated by the second indication information includes at least one of the following conditions: a threshold value of an interference level of the communication resource and a threshold value of a collision level of the communication resource.

Optionally, in some embodiments, the terminal device 500 is a terminal device in an idle state.

Figure 6:
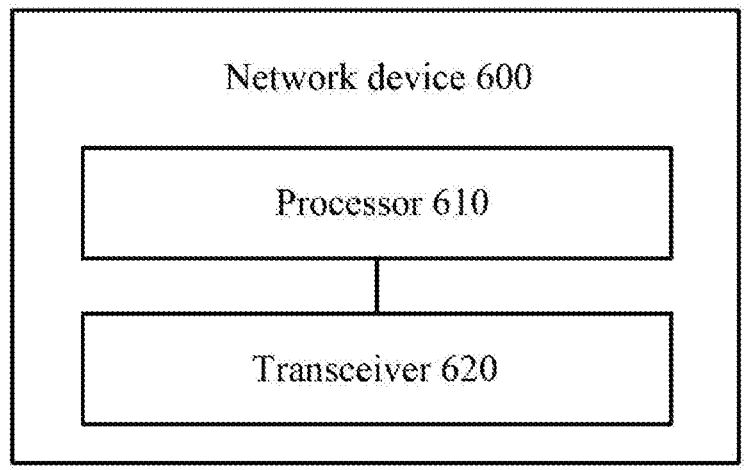
FIG. 6 is a schematic diagram of a network device according to an embodiment of the present disclosure.

FIG. 6 is a schematic diagram of a network device according to an embodiment of the present disclosure. The network device 600 of FIG. 6 includes: a processor 610 and a transceiver 620.

The processor 610 is used for generating first indication information, wherein the first indication information is used for instructing a terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device 600, and the third communication mode is a communication mode in which the communication is performed via a direct-connection interface and controlled by the terminal device.

The transceiver 620 is used for sending the first indication information to the terminal device.

In an embodiment of the present disclosure, a terminal device performs switching between different communication modes based on first indication information sent by a network device, so that the terminal device may switch between various communication modes, and flexibility of a communication system is improved.

Optionally, in some embodiments, the current communication mode is one of the first communication mode and the second communication mode, the target communication mode is another one, other than the current communication mode, of the first communication mode and the second communication mode, the transceiver 620 is specifically used for sending reconfiguration signaling to the terminal device, the reconfiguration signaling includes the first indication information, and the reconfiguration signaling is used for instructing the terminal device to switch a communication mode to the target communication mode according to the first indication information while maintaining a control connection between the terminal device and the network device 600.

Optionally, in some embodiments, the reconfiguration signaling is one of the following signaling: Radio Resource Control (RRC) reconfiguration signaling, Media Access Control Control Element (MAC CE), and physical layer signaling.

Optionally, in some embodiments, the current communication mode is one of the first communication mode and the second communication mode, the target communication mode is another one, other than the current communication mode, of the first communication mode and the second communication mode, the transceiver 620 is specifically used for sending release signaling to the terminal device, the release signaling includes the first indication information, and the release signaling is used for instructing the terminal device to switch a communication mode to the target communication mode according to the first indication information after releasing a control connection between the terminal device and the network device 600.

Optionally, in some embodiments, the release signaling is one of the following signaling: RRC connection release signaling, MAC CE, and physical layer signaling.

Optionally, in some embodiments, the transceiver 620 is specifically used for sending system information to the terminal device, and the system information includes the first indication information.

Optionally, in some embodiments, the transceiver 620 is also used for receiving resource occupancy information sent by the terminal device, and the resource occupancy information is used for indicating an occupancy status of a communication resource in the current communication mode.

Optionally, in some embodiments, the resource occupancy information includes at least one of interference related information of the communication resource, and collision related information of the communication resource.

Optionally, in some embodiments, the transceiver 620 is also used for receiving service information of a service to be processed of the terminal device sent by the terminal device.

Optionally, in some embodiments, the service information of the service to be processed includes at least one of the following: a transmission period of a data packet in the service to be processed, a transmission mode of a data packet in the service to be processed, a type of a bearer used by the service to be processed, and a size of a data packet in the service to be processed.

Optionally, in some embodiments, the transceiver 620 is further used for sending second indication information to the terminal device, wherein the second indication information is used for indicating a trigger event of switching, by the terminal device, from the current communication mode to the target communication mode.

Optionally, in some embodiments, the second indication information is used for instructing the terminal device to switch from the current communication mode to the target communication mode when the occupancy status of the communication resource in the current communication mode satisfies a condition indicated by the second indication information.

Optionally, in some embodiments, the condition indicated by the second indication information includes at least one of the following conditions: a threshold value of an interference level of the communication resource, and a threshold value of a collision level of the communication resource.

Optionally, in some embodiments, the terminal device is a terminal device in an idle state.

Those of ordinary skill in the art will recognize that the exemplary elements and algorithm acts described in connection with the embodiments disclosed herein can be implemented in electronic hardware, or a combination of computer software and electronic hardware. Whether these functions are performed in hardware or software depends on the specific application and design constraints of the technical solution. Skilled in the art may use different methods to implement the described functions for each particular application, but such implementation should not be considered to be beyond the scope of the present disclosure.

Those skilled in the art can clearly understand that for convenience and conciseness of description, corresponding processes in the aforementioned method embodiments may be referred to for the specific working processes of the system, device, and unit described above, which are not repeated here.

In several embodiments provided by the present application, it should be understood that the disclosed system, apparatus and method may be implemented in other ways. For example, the apparatus embodiments described above are only illustrative, for example, the division of the units is only a logical function division, and there may be other division manners in actual implementation. For example, multiple units or components may be combined or integrated into another system, or some features may be ignored or not executed. On the other hand, the mutual coupling or direct coupling or communication connection shown or discussed may be indirect coupling or communication connection through some interface, apparatus or unit, and may be electrical, mechanical or in other forms.

The unit described as a separate component may or may not be physically separated, and the component shown as a unit may or may not be a physical unit, i.e., it may be located in one place or may be distributed over multiple network units. Some or all of the units may be selected according to practical needs to achieve a purpose of the embodiments.

In addition, various functional units in various embodiments of the present disclosure may be integrated in one processing unit, or various units may be physically present separately, or two or more units may be integrated in one unit.

The functions may be stored in a computer readable storage medium if implemented in a form of software functional units and sold or used as a separate product. Based on this understanding, the technical solution of the present disclosure, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various embodiments of the present disclosure. The aforementioned storage media include U disk, mobile hard disk, read-only memory (ROM), random access memory (RAM), magnetic disk or optical disk, and other media capable of storing program codes.

The foregoing are merely exemplary embodiments of the present disclosure, but the protection scope of the present disclosure is not limited thereto. Any person skilled in the art can easily conceive changes or substitutions within the technical scope disclosed by the present disclosure, which should be included within the protection scope of the present disclosure. Therefore, the protection scope of the present disclosure should be subject to the protection scope of the claims.

What I claim is:

1. A method for switching a communication mode, comprising:
   receiving, by a terminal device, first indication information sent by a network device, wherein the first indication information is used for instructing the terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device, which refers to a direct-connection communication between terminal devices, and in this communication mode, a communication resource between the terminal devices is allocated autonomously by the terminal device;
   when the terminal device is in a connected state, switching, by the terminal device, a communication mode according to the first indication information; and
   when the terminal device is in an idle state, receiving second indication information sent by the network device, and determining, based on the second indication information, whether to switch according to the first indication information, wherein the second indication information indicates a trigger event of switching, by the terminal device, from the current communication mode to the target communication mode.

2. The method of claim 1, wherein the current communication mode is one of the first communication mode and the second communication mode, and the target communication mode is another one, other than the current communication mode, of the first communication mode and the second communication mode,
   receiving, by the terminal device, the first indication information sent by the network device, comprises:
   receiving, by the terminal device, reconfiguration signaling sent by the network device, wherein the reconfiguration signaling comprises the first indication information, and the reconfiguration signaling is used for instructing the terminal device to switch the communication mode to the target communication mode according to the first indication information while maintaining a control connection between the terminal device and the network device.

3. The method of claim 2, wherein the reconfiguration signaling is one of the following signaling: Radio Resource Control (RRC) reconfiguration signaling, Media Access Control Control Element (MAC CE), and physical layer signaling.

4. The method of claim 1, wherein the current communication mode is one of the first communication mode and the second communication mode, and the target communication mode is another one, other than the current communication mode, of the first communication mode and the second communication mode,
   receiving, by the terminal device, the first indication information sent by the network device, comprises:
   receiving, by the terminal device, release signaling sent by the network device, wherein the release signaling comprises the first indication information, and the release signaling is used for instructing the terminal device to switch the communication mode to the target communication mode according to the first indication information after releasing a control connection between the terminal device and the network device.

5. The method of claim 4, wherein the release signaling is one of the following signaling: RRC connection release signaling, MAC CE, and physical layer signaling.

6. The method of claim 1, wherein before receiving, by the terminal device, the first indication information sent by the network device, the method further comprises:
   sending, by the terminal device, resource occupancy information to the network device, wherein the resource occupancy information is used for indicating an occupancy status of a communication resource in the current communication mode.

7. The method of claim 6, wherein the resource occupancy information comprises at least one of interference related information of the communication resource, and collision related information of the communication resource.

8. The method of claim 1, wherein the method further comprises:
   sending, by the terminal device, service information of a service to be processed of the terminal device to the network device,
   wherein the service information of the service comprises at least one of the following: a transmission period of a data packet, a transmission mode of a data packet, a bearer type, and a data packet size.

9. The method of claim 1, wherein the second indication information is used for instructing the terminal device to switch from the current communication mode to the target communication mode when an occupancy status of a communication resource in the current communication mode satisfies a condition indicated by the second indication information,
   wherein the condition indicated by the second indication information comprises at least one of the following conditions: a threshold value of an interference level, and a threshold value of a collision level.

10. A method for switching a communication mode, comprising:
    generating, by a network device, first indication information, wherein the first indication information is used for instructing a terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device, which refers to a direct-connection communication between terminal devices, and in this communication mode, a communication resource between the terminal devices is allocated autonomously by the terminal device;

when the terminal device is in a connected state, sending, by the network device, the first indication information to the terminal device; and when the terminal device is in an idle state, sending, by the network device, the first indication information and second indication information to the terminal device, wherein the second indication information is used for the terminal device to determine whether to switch according to the first indication information, and wherein the second indication information indicates a trigger event of switching, by the terminal device, from the current communication mode to the target communication mode.

11. The method of claim 10, wherein the current communication mode is one of the first communication mode and the second communication mode, and the target communication mode is another one, other than the current communication mode, of the first communication mode and the second communication mode, sending, by the network device, the first indication information to the terminal device, comprises:

sending, by the network device, reconfiguration signaling to the terminal device, wherein the reconfiguration signaling comprises the first indication information, and the reconfiguration signaling is used for instructing the terminal device to switch a communication mode to the target communication mode according to the first indication information while maintaining a control connection between the terminal device and the network device, wherein the reconfiguration signaling is one of the following signaling: Radio Resource Control (RRC) reconfiguration signaling, Media Access Control Control Element (MAC CE), and physical layer signaling.

12. The method of claim 10, wherein the current communication mode is one of the first communication mode and the second communication mode, and the target communication mode is another one, other than the current communication mode, of the first communication mode and the second communication mode, sending, by the network device, the first indication information to the terminal device, comprises:

sending, by the network device, release signaling to the terminal device, wherein the release signaling comprises the first indication information, and the release signaling is used for instructing the terminal device to switch a communication mode to the target communication mode according to the first indication information after releasing a control connection between the terminal device and the network device, wherein the release signaling is one of the following signaling: RRC connection release signaling, MAC CE, and physical layer signaling.

13. The method of claim 10, wherein before generating, by the network device, the first indication information, the method further comprises:

receiving, by the network device, resource occupancy information sent by the terminal device, wherein the resource occupancy information is used for indicating an occupancy status of a communication resource in the current communication mode, wherein the resource occupancy information comprises at least one of interference related information of the communication resource, and collision related information of the communication resource.

14. The method of claim 10, wherein the method further comprises:

receiving, by the network device, service information of a service to be processed of the terminal device sent by the terminal device, wherein the service information of the service comprises at least one of the following: a transmission period of a data packet, a transmission mode of a data packet, a bearer type, and a data packet size.

15. The method of claim 10, wherein the second indication information is used for instructing the terminal device to switch from the current communication mode to the target communication mode when an occupancy status of a communication resource in the current communication mode satisfies a condition indicated by the second indication information, and wherein the condition indicated by the second indication information comprises at least one of the following conditions: a threshold value of an interference level, and a threshold value of a collision level.

16. A terminal device, comprising: a transceiver and a processor, wherein the transceiver is used for receiving first indication information sent by a network device, wherein the first indication information is used for instructing the terminal device to switch from a current communication mode to a target communication mode, wherein the current communication mode and the target communication mode are any two of a first communication mode, a second communication mode, and a third communication mode, wherein the first communication mode is a communication mode in which the communication is performed via a Uu interface, the second communication mode is a communication mode in which the communication is performed via a direct-connection interface and controlled by the network device, and the third communication mode is a communication mode in which the communication is performed via a direct-connection interface and controlled by the terminal device, which refers to a direct-connection communication between terminal devices, and in this communication mode, a communication resource between the terminal devices is allocated autonomously by the terminal device; and the processor is used for:

when the terminal device is in a connected state, switching a communication mode according to the first indication information; and when the terminal device is in an idle state, receiving second indication information sent by the network device, and determining, based on the second indication information, whether to switch according to the first indication information, wherein the second indication information indicates a trigger event of switching, by the terminal device, from the current communication mode to the target communication mode.

17. The terminal device of claim 16, wherein the current communication mode is one of the first communication mode and the second communication mode, the target communication mode is another one, other than the current communication mode, of the first communication mode and the second communication mode, the transceiver is specifically used for receiving reconfiguration signaling sent by the network device, the reconfiguration signaling comprises the first indication information, and the reconfiguration signaling is used for instructing the terminal device to switch a communication mode to the target communication mode according to the first indication information while maintaining a control connection between the terminal device and the network device, wherein the reconfiguration signaling is one of the following signaling: Radio Resource Control (RRC) reconfiguration signaling, Media Access Control Control Element (MAC CE), and physical layer signaling.

18. The terminal device of claim 16, wherein the current communication mode is one of the first communication mode and the second communication mode, the target communication mode is another one, other than the current communication mode, of the first communication mode and the second communication mode, the transceiver is specifically used for receiving release signaling sent by the network device, the release signaling comprises the first indication information, and the release signaling is used for instructing the terminal device to switch a communication mode to the target communication mode according to the first indication information after releasing a control connection between the terminal device and the network device, wherein the release signaling comprises at least one of the following signaling: RRC connection release signaling, MAC CE, and physical layer signaling.

19. The terminal device of claim 16, wherein the transceiver is further used for sending resource occupancy information to the network device, wherein the resource occupancy information is used for indicating an occupancy status of a communication resource in the current communication mode, wherein the resource occupancy information comprises at least one of interference related information of the communication resource, and collision related information of the communication resource, wherein the transceiver is further used for sending service information of a service to be processed of the terminal device to the network device, wherein the service information of the service comprises at least one of the following: a transmission period of a data packet, a transmission mode of a data packet, a bearer type, and a data packet size.

* * * * *